UNITED STATES PATENT OFFICE.

ROBERT A. FISHER, OF PHILADELPHIA, PENNSYLVANIA.

MANUFACTURE OF SIZING FOR PAPER-MAKERS' USE.

SPECIFICATION forming part of Letters Patent No. 321,097, dated June 30, 1885.

Application filed March 6, 1885. (No specimens.)

*To all whom it may concern:*

Be it known that I, ROBERT A. FISHER, of the city and county of Philadelphia, State of Pennsylvania, have invented a new and useful Improvement in the Manufacture of Sizing Material for Paper-Makers' Use, of which the following is a full, clear, and exact description.

My invention consists in the production of sulphate of alumina, free or almost free from iron, in a porous or vesicular condition directly from bauxite or any other aluminous mineral containing iron.

The following is a convenient method of carrying out my invention, viz: Into a suitable lead-lined vat introduce a proper quantity of sulphuric acid, of density 50° Baumé, (more or less.) Then heat it by steam or otherwise to the temperature of 190° Fahrenheit, more or less, and introduce finely-ground bauxite or other ferruginous aluminous substance into the hot acid. The relative proportions of acid and aluminous material required to produce the desired result will vary with the strength of the acid and the amount of alumina and iron contained in the bauxite or other ferro-aluminous substance. It may be stated in a general way that one hundred pounds of sulphuric acid, of density 50° Baumé, will require forty to fifty pounds of bauxite of average alumina content; but enough aluminous material should be used to produce a solution of sulphate of alumina which shall be neutral, or at least contain only a slight excess of acid. Soon after contact of the bauxite and acid violent chemical action will take place, and the contents of the tank will rapidly rise. To prevent an overflow small quantities of cold water should from time to time be added. When the chemical action has nearly ceased, there must be added enough water or "mother liquor" from a previous operation to keep all the sulphate of alumina in solution when the liquid shall have cooled down to the temperature of the surrounding air.

The next step in my process is to remove iron. This is accomplished by means of an oxide of lead or manganese or other compound of manganese. A proper quantity of plumbic oxide or other oxide of lead, or manganic dioxide or sesquioxide, or permanganate of potash, is added to the bauxite, (or other ferro-aluminous solution,) either after it has been cleared by settling or filtration or while it is still muddled by mechanically-suspended impurities. The whole is then to be briskly stirred for fifteen minutes, more or less. The amount of material required to separate the iron in an insoluble form from the aluminous liquid will depend not only upon the actual amount of iron, but also upon the relative proportion of ferrous and ferric oxide present in the aluminous liquid. If iron be present only as ferric oxide, perhaps ten per cent. of the weight of sulphate of alumina to be produced will suffice. After briskly stirring the aluminous liquid for fifteen minutes, more or or less, (subsequent to adding the compound of lead or manganese,) filter off a small portion and test for iron. If only traces of iron remain in the solution, further addition of the material employed to remove iron is not necessary. If iron be present in the aluminous liquid as ferrous oxide, the same will be converted into ferric oxide at the expense of the lead or manganese compound employed to remove the iron. If the quantity of ferrous oxide be small, such loss may be disregarded; but if ferrous oxide be present in considerable quantity it should be converted into ferric oxide by means of some cheaper oxidizing agent before introducing the lead or manganese compound. For this purpose a sufficient quantity of solution of chloride of lime, or of bichromate of potash, or nitric acid, or any other suitable oxidizing agent must be added to the aluminous liquid, which should then be heated and allowed to cool before adding the compound of lead or manganese.

I do not confine myself to the use of plumbic oxide or other oxide of lead or dioxide, and sesquioxide of manganese, or permanganate of potash to remove the iron from the ferro-aluminous solution. Any substance that will produce an equivalent result—that is, separate the iron in an insoluble condition—will answer the purpose.

After the iron has been nearly or entirely removed from the aluminous solution, the latter must be separated from the insoluble matter it may contain either by subsidence or by passing the liquid through a filter or filtering-press. The clear solution of sulphate of alumina is then to be concentrated in a suitable evaporator by steam or otherwise until its density is 65° Baumé, more or less. The next step in my process is to convert this concentrated liquid into a substance that when cold consists, essentially, of sulphate of alumina and water made porous by innumerable small holes or vesicles. This may be accomplished thus: The hot liquor, of density 65° Baumé, (more or less,) is allowed to cool, with or without stirring, until it becomes viscid. A small quantity of bicarbonate of soda—say two (2) or three (3) pounds, (more or less,) to one thousand pounds sulphate of alumina—is sprinkled upon the surface of the hot viscid sulphate of alumina and then stirred rapidly into the mass, which when thoroughly mixed and sufficiently cool is discharged into a suitable receptacle, and finally broken or crushed into lumps of the desired size.

I do not confine myself to the use of bicarbonate of soda to produce the desired porosity.

Any carbonate or bicarbonate or other body which, by contact with hot viscid sulphate of alumina, will inflate the mass and render it frothy while hot and porous, or vesicular when cold will answer the purpose. A like result may be obtained by the rapid injection of air, steam, or vapor of water, or other gaseous body into the mass of viscid sulphate of alumina, the object being the production and retention of the vesicular or porous condition of the said mass in the act of cooling and hardening; but of all these different methods of producing the desired porosity of the sulphate of alumina I prefer the use of bicarbonate of soda.

I am aware that Henry Pemberton, of Allegheny City, State of Pennsylvania, has patented a process, No. 82,747, for producing porosity in a hot concentrated solution of pure sulphate of alumina made from pure hydrated alumina, (from cryolite.) I am also aware that Fahlberg and Lemper, of Philadelphia, No. 257,567, and Conrad Lemper No. 264,733 and No. 264,734, have patented processes for removing iron from aluminous solutions, "which solutions can be utilized in the usual way by either boiling them down till by hardening they form a cake, or by evaporating to dryness, or by leaving them to crystallize."

My improvement saves both time and money by avoiding the time required and the expense of first producing a hard aluminous cake or crystal alum, either of which requires subsequent grinding before it is in the condition required as a sizing for paper-makers' use.

By my process in less than an hour after the solution of sulphate of alumina has reached the proper degree of concentration the material can be put into a marketable condition, and its peculiar porous character greatly facilitates its solubility in cold water.

Having thus fully described my invention, what I claim as new, and desire to secure by Letters Patent, is—

1. The process herein described of manufacturing a porous material for paper-makers' use containing sulphate of alumina and water free or nearly free from iron.

2. The process herein described of producing directly from any aluminous substance containing iron a porous material for paper-makers' use containing sulphate of alumina and water free or nearly free from iron.

3. The process described of producing directly from any aluminous substance containing iron a porous material for paper-makers' use containing sulphate of alumina and water free or nearly free from iron, the process consisting, essentially, in first heating sulphuric acid and mixing into it any finely-ground ferruginous alum-clay, and adding water from time to time to prevent overflow, next removing all or nearly all the iron contained in the resulting solution of sulphate of alumina by means of plumbic oxide or other oxide of lead, dioxide or sesquioxide of manganese, or permanganate of potash, or any other substance that will precipitate iron from aluminous solutions, then separating all suspended or insoluble matter by subsidence or by filtration, then concentrating the clear solution thus obtained, then adding bicarbonate of soda and stirring the same rapidly into the hot viscid sulphate of alumina, and, finally, when cold, crushing the porous vesicular mass thus obtained into lumps of the desired sizes.

ROBERT A. FISHER.

Witnesses:
 MATT. CLIFTON,
 EDW. SCHINDEL.